Nov. 22, 1932.  G. C. FRANTZ  1,888,223
VALVE
Filed Oct. 28, 1930   2 Sheets-Sheet 1
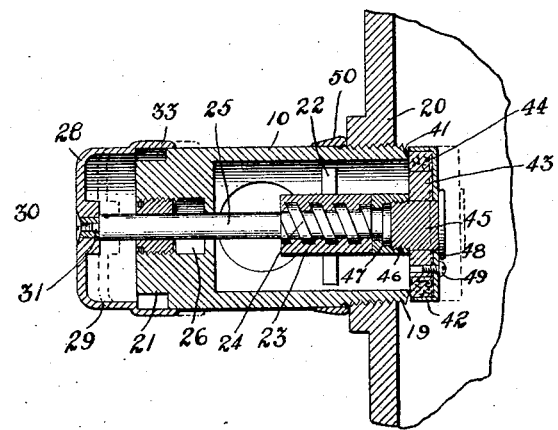
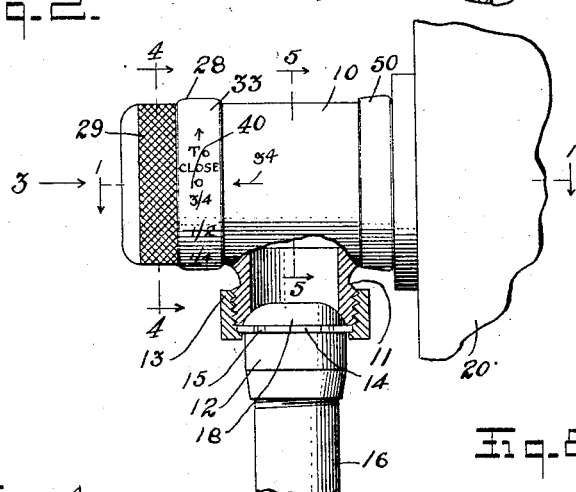
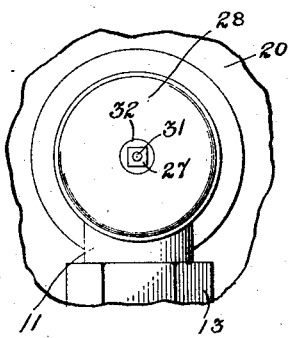
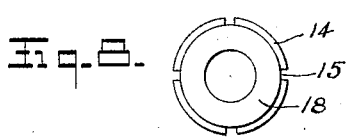
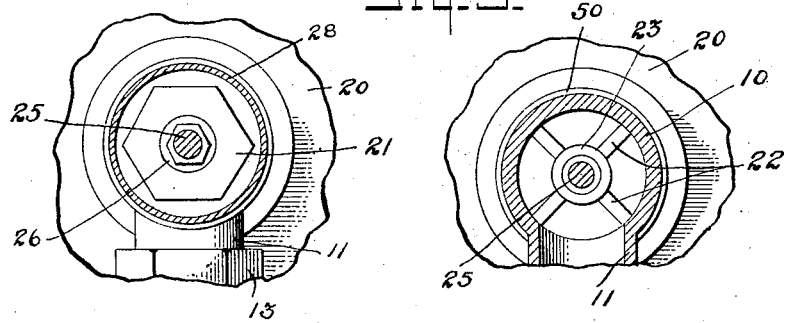
WITNESS:
INVENTOR
Grover C. Frantz
BY
Joshua R. H. Potts
HIS ATTORNEY

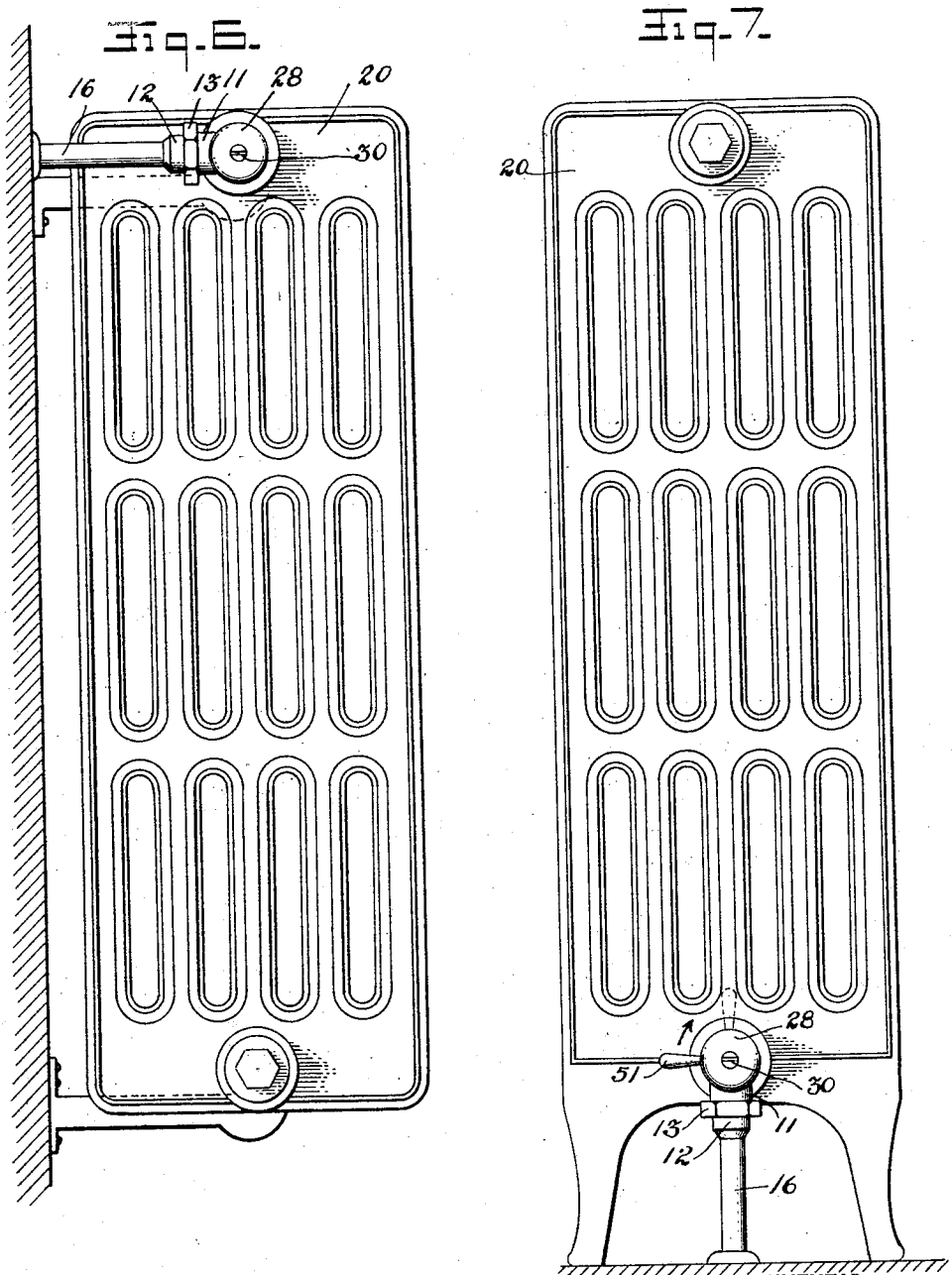

Patented Nov. 22, 1932

1,888,223

UNITED STATES PATENT OFFICE

GROVER C. FRANTZ, OF HARRISBURG, PENNSYLVANIA, ASSIGNOR TO DAUPHIN DEPOSIT TRUST COMPANY, OF HARRISBURG, PENNSYLVANIA

VALVE

Application filed October 28, 1930. Serial No. 491,660.

This invention relates to valves, and has for an object to provide a valve embodying new and improved features of convenience and adaptability.

The valve involved in the present application, is adapted for use in many situations, and for many purposes, but is more particularly designed for operation as a valve for radiators, of the heating type. Present day demands in the way of valves for heating radiators, is for pleasing appearance, economy of space, and freedom from dirt gathering. From the point of view of the installer, adaptability to various situations and convenience of installing, is required. The present valve is directed to meeting all of these requirements in a new and improved manner.

The valve, therefore, adapts itself to use in the many situations in radiator installations, and to be adaptable to radiators of various sizes. It also is arranged to occupy the minimum space, and is provided with no angles, shoulders, or the like, for catching and holding dirt.

An object of the invention is to provide a valve which may be associated with a radiator of any type, either hot water, steam, or vapor, and to connect with the radiators of the floor type, or the wall type, at the top or the bottom, or in any situation required with the connecting pipe arranged vertical or horizontal.

A further object of the invention is to provide a valve wherein the valve itself is located within the radiator, with only the connections and operating means extending outwardly and occupying space.

A further object of the invention is to provide a valve which can be quickly applied, and which will adapt itself to any position when so applied.

The invention is directed to other objects and possesses other features of novelty and advantage, some of which, together with the foregoing, will be hereinafter more fully set forth.

In the drawings:—

Figure 1 is a longitudinal sectional view through the improved valve, showing a section of a radiator, Figure 2 is a view of the valve in top plan, a part being broken away to show the union connection, Figure 3 is an end view of the valve along the line indicated by arrow 3, at Figure 2, with the screw removed which connects the dial to the valve stem, Figure 4 is a transverse sectional view, taken on line 4—4 of Figure 2, Figure 5 is a transverse sectional view, taken on line 5—5 of Figure 2, Figure 6 is a view in end elevation of a conventional wall type of radiator, showing the connection of the valve from the wall to the top of the radiator, Figure 7 is a view in end elevation of a conventional floor radiator, showing the valve connected from a pipe, through the floor, at the bottom of the radiator, and Figure 8 is a top plan view of the spud forming a part of the union.

Like characters of reference indicate corresponding parts throughout the several views.

The improved valve, which forms the subject matter of this application, is described herein as associated with a radiator of the heating type, for the reason that, at the present time, this seems to be the greatest field of its utility, but it is to be understood, that the description of this association, or any reference to radiators is only illustrative, and no connection shown is any limitation upon the invention.

The valve comprises a body part 10, which has an offset nipple 11. The nipple 11 forms a part of a union joint, the other members of which, are the spud 12, and collar 13. The spud 12, is provided with a flange 14, having peripheral notches 15, by the employment of which, a spanner may be used to screw the spud upon the supply pipe 16. This is for the purpose of avoiding marring the spud, which will form a part of the valve structure, and in use, will be highly finished. The collar 13, operating upon the nipple 11, and engaging the flange 14, will bind the arcuate or tapered end 18 of the spud in proper union relation with the nipple.

The body 10, of the valve, is provided with a threaded part 19, adapted to screw into the opening of a radiator, shown conventionally at 20. At the present time, the inlet openings of radiators, have been standardized to uniformity, so that the threaded part 19 of the body of the valve, will be threaded to correspond to the standard threading of the radiator, and will therefore, fit any and all standard present day radiators. For very large size radiators, a different standard is provided which would require two sizes of valves, but not more than two sizes of valves will be required under any condition.

For the purpose of properly screwing the body 10 into the radiator without marring, the end opposite the thread is provided with a multi-angular part 21 to receive a wrench. This part is covered from sight as will be hereinafter more fully described, so that any marring that may occur at this part, will be hidden from view.

The body 10 is provided with a spider 22 which supports a hub 23, co-axially of the body itself, which hub is threaded to receive the quick acting thread 24 of the valve spindle 25. The valve spindle 25 extends through a packing gland 26, and at its end remote from the threads, is squared or otherwise provided with angular means, as indicated at 27, to receive the grip cover dial 28. This dial is preferably knurled for convenience of manipulation, as shown at 29, and is attached to the spindle 25 by means of a screw 30 inserted into the bore 31 of the spindle, and for looks as well as to prevent the catching of dirt, the screw is seated in the countersink 32.

The dial 28, in addition to the knurled part 29, comprises a sleeve 33 which fits over the body 10 and is preferably rounded. The body is provided with an arrow, or other pointer 34, and the dial with a graduated scale 40.

The quick acting thread 24 is such that the valve to be hereinafter more fully described, is open or closed by a half (½) revolution of the dial, and the graduations therefore, will be about one half (½) of the sleeve 33. It is the purpose of the present invention to employ three of the indicators, or arrows 34, one at each opposite side, and one at the top, the top being considered, for these explanations, as shown at Figure 2.

As the end 27, of the spindle is squared, the dial may therefore, be set at any quarter (¼) turn, and it is immaterial whether the nipple 11, and its associated parts, extend downwardly as shown at Figure 7, or in either right or left direction, as indicated at Figure 6, and in either of these positions, one of the indicators, or arrows 34, will be at the top of the body, and the dial may be set so that when closed, the zero mark, as shown at Figure 2, will be opposite the arrow then appearing at the top of the body.

The end of the body which extends within the radiator, and is an extension of the threaded part, comprises a valve seat 41, being properly machined, or finished for the purpose.

The valve comprises a shell 42, within which, or integral with which, is a central annulus 43. About this central annulus 43, an annulus 44 is provided, the latter being of such composition as is usually employed in valves, but the invention is in no way limited to such a composition, nor is it limited to the making of the valve of independent annuli 43 and 44 as shown, as the valve may be an integral member which would include the shell 42, and the annuli 43 and 44.

The valve member is attached to the valve stem 25 by means of a screw 45 which extends centrally through this valve and engages a cuff 46. The valve stem itself is also extended at this end through this cuff 46 and upset at 47. The relation of the valve stem to the cuff, both as to its swiveling therein, and the upset part 47, is such as to provide some "play" between the valve stem and the cuff to provide for the proper and uniform seating of the valve against the valve seat 41.

For installations for hot water heating, provision is made for the circulation of a small amount of water through the radiator at all times to prevent freezing. This is ordinarily provided by forming a by-pass in the valve. The present valve is bored at 48, and a screw 49 is fitted therein. When the valve is employed for steam or vapor installation, the screw remains as shown at Figure 1, but when the valve is employed for hot water installation, the screw is removed and omitted from the structure.

The body 10 is also provided with a ring 50 thereon to cover such of the threads 19 as may, in the final adjustment, be exposed without the radiator structure, thus making a neat appearing organization.

It will be especially noted, that the device as installed, will be neat in appearance, and will occupy but the minimum space beyond the radiator required for caring for the inlet pipe and dial.

When installed, as shown at Figure 7, at the bottom of the radiator, the dial 28 may be provided with an offset lever 51, which may be engaged by the toe of the operator to move the valve in the direction indicated by the arrow a half (½) turn to open and close the valve. In this manner, it is not necessary to stoop for opening or closing the valve.

It will be further noted, that when the valve opens, the dial moves toward the radiator and likewise diminishes the space occupied. In the great majority of installations, such valves are seldom operated manually, dependence being had upon manual or mechanical control of the heating fluid at its source, rather than upon the opening and closing of the valve of the radiator, and it is the purpose, therefore, to provide such a device as in its position of greatest utility, will occupy the minimum space.

By the shortening of the organization, the appearance is improved. At Figure 2, the relation of the dial to the body is shown as in open valve position wherein it is closely adjacent to the nipple 11, while at Figure 1, the parts are shown in valve closed position so that the valve is seated, and the dial extended to its operative limit.

In the installation of this valve, the dial 28 will be removed and the body 10 then screwed into the radiator such a distance as to provide a tight joint, and until the nipple 11 is in the right position for forming a union joint with the spud 18, which has theretofore been applied to the inlet pipe 16. It is immaterial whether the pipe be a vertical pipe, as shown at Figure 7, or whether it be a horizontal pipe, as shown at Figure 6, and if the latter, whether extending to the right or the left, as the valve is located. The position having been attained, the union is made of the nipple 11 and spud 12 in the usual manner by the use of the collar 13. With the body thus located, one of the three arrows 34 will be uppermost, that is to say, at the top of the body, as then located. With the valve seated as shown at Figure 1, the dial will be applied in such manner that the zero mark will be opposite the arrow.

At Figure 2, the valve is shown open, therefore the open graduate mark is shown opposite the arrow, and in this position, the graduations would result in a designation, indicating closed at that part shown at the bottom of said figure. It will be understood, of course, that with the arrow located as shown at Figure 2, the inlet valve 16 is supposed to be a horizontal valve, otherwise, the particular arrow 34 shown, would not be on top, but irrespective of the position, one of the arrows provided will always be at the top. The dial having been applied, the screw 30 is seated, forming a smooth end of the dial. The ring 50 is now moved to position against the radiator so that any overrun in the threads will be concealed. Thus mounted, the organization presents no shoulders or flanges for catching or holding the dirt, and presents withall, a neat and pleasing appearance.

When mounted as shown at Figure 7, the toe lever 51 is applied in addition at such quarter turns as will make it convenient for operation.

It will be noted, especially from Figure 1, that the valve seat 41 is arranged in a vertical plane. This prevents, or at least minimizes, the collection of any extraneous material upon the valve seat, as any thing, so tending to collect, would be dislodged by the flow of the heating fluid and would simply drop.

It will also be noted, as from Figure 5, that the spider is quadrate, and that the legs are so located, that in any of the three positions the valve might assume, the lowermost part would always be between two of the legs of the spider, thus permitting free flow and drainage through the entire valve organization.

It will be noted, again from Figure 1, that this valve seat is practically co-extensive with the threaded opening of the radiator, requiring no bushing, as the housing 10, threaded as at 19, co-acts with the threaded part of the radiator. When located at the bottom of the radiator, as at Figure 7, this provides for drainage of all of the condensates, which would otherwise accumulate and be trapped within the radiator. This also provides for an enlarged valve area insuring a more free flow of the heating fluid into the radiator as well as condensate return.

The spud 12, as will be noted, is tapered at the end joining the pipe 16. In the exact relations, as shown, this is largely for appearance as the spud is intended to be replaced by spuds corresponding to other pipe sizes so that by the mere replacement of interchangeable spuds, the nipple 11 will co-act with systems employing various sizes of piping.

Of course, the valve herein illustrated, may be modified in various ways without departing from the invention herein set forth and hereinafter claimed.

The invention is hereby claimed as follows:—

1. A valve organization comprising a cylindrical body having an offset for supply connection, a valve seated upon and closing one end of the body, a valve stem extending axially of the body and having threaded connection with the body, and a cap connected with the valve stem and covering the end of the body opposite the valve, said cap being rotatively adjustable relative to the stem.

2. A valve organization comprising a cylindrical body having external threads at one end, the threaded part terminating in a valve seat, a valve covering the end of the body and seating upon the valve seat, a threaded hub located within the body, a threaded valve stem having interconnection with the threaded hub and extending outwardly through the end of the body opposite the valve, and a cap adjustably connected with the extended end of the valve stem and embracing the body.

3. A valve organization comprising a body having external threads at one end and at its opposite end an angular implement receiving part, a valve closing the body at the threaded end, a valve stem extending axially of the body, and a cap connected with the valve stem and covering the implement receiving part.

4. A valve organization comprising a body having at one end external threads terminating in a valve seat, a valve covering the end of the body and seating upon the seat, a threaded hub located within the body, a valve stem extending through the hub and having threaded connection therewith, said valve stem extending outwardly through the body at the end opposite the threads, implement receiving shoulders formed upon the body surrounding the extended end of the valve stem, and a cap connected with the end of the stem and covering the shoulders and embracing the body.

5. A valve organization comprising a body having an open end externally threaded, a valve covering the open end of the body, a passage formed through said valve, a closure for said passage, a valve stem extending through the body, and a cap connected with the stem and embracing the body.

6. A valve organization comprising a body having one open end externally threaded and terminating in a valve seat, a valve closing said open end and seated upon the valve seat, said valve being provided with a bleeder perforation, a closure for the bleeder perforation, a hub located within the body and provided with internal threads, a valve stem extending through the hub and having threaded connection therewith, and a cap carried by the valve stem embracing the body at the end opposite the threads.

7. A valve organization comprising a body having one end threaded, an offset from said body providing connection for an inlet pipe, a valve closing said end of the body, a valve stem extending through and without the body, and a cap provided for variable connection with the valve stem determined by the position of the inlet connection.

8. A valve organization comprising a body threaded at one end, an offset from said body providing communication for an inlet pipe, a valve closing said threaded end of the body, a valve stem extending through the body, and a cap connectible with the valve stem at adjusted positions determined by the position of the inlet pipe and embracing the end of the body opposite the threads.

In testimony whereof I have signed my name to this specification.

GROVER C. FRANTZ.